United States Patent
Kim et al.

(10) Patent No.: US 7,728,923 B2
(45) Date of Patent: Jun. 1, 2010

(54) BACKLIGHT UNIT AND DISPLAY DEVICE HAVING THE SAME

(75) Inventors: Su-gun Kim, Hwaseong-si (KR); Tae-hee Cho, Seoul (KR); Ki-bum Seong, Anyang-si (KR); Jun-young Lee, Yongin-si (KR); Jung-hyeon Kim, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 274 days.

(21) Appl. No.: 11/515,043

(22) Filed: Sep. 5, 2006

(65) Prior Publication Data
US 2007/0058393 A1 Mar. 15, 2007

(30) Foreign Application Priority Data
Sep. 9, 2005 (KR) .................. 10-2005-0084074

(51) Int. Cl.
*G02F 1/1335* (2006.01)
*G01D 11/28* (2006.01)
*F21V 7/04* (2006.01)

(52) U.S. Cl. .................. 349/65; 362/26; 362/613
(58) Field of Classification Search .................. 349/65; 362/26, 601, 613, 612, 616
See application file for complete search history.

(56) References Cited

U.S. PATENT DOCUMENTS 7,223,005 B2 * 5/2007 Lamb et al. ............ 362/615
2003/0227768 A1 * 12/2003 Hara et al. ............. 362/31
2005/0168967 A1 * 8/2005 Kao et al. .............. 362/27

FOREIGN PATENT DOCUMENTS

| CN | 1558283 | 12/2004 |
| JP | 2001-135118 | 5/2001 |
| JP | 2002-258281 | 9/2002 |
| JP | 2004-055327 | 2/2004 |
| JP | 2004-139876 | 5/2004 |
| KR | 10-1997-0013073 | 11/1998 |
| KR | 10-2004-0021178 A | 3/2004 |
| KR | 10-2004-0074406 A | 8/2004 |
| KR | 10-2005-0011901 A | 1/2005 |
| TW | 200409882 | 6/2004 |
| WO | WO 2004/008023 A1 | 1/2004 |

* cited by examiner

*Primary Examiner*—Charlie Peng
(74) *Attorney, Agent, or Firm*—Roylance, Abrams, Berdo & Goodman, LLP

(57) ABSTRACT

A backlight unit and method of use are provided having a first light guide plate, a linear light source disposed along at least one side edge of the first light guide plate, a plurality of second light guide plates facing the first light guide plate, and a point light source disposed along at least one side edge of each second light guide plate. Accordingly, the present invention can provide a backlight unit using both a point light source and a linear light source at substantially the same time, and having superior color reproducibility and low power consumption.

20 Claims, 6 Drawing Sheets

BACKLIGHT UNIT AND DISPLAY DEVICE HAVING THE SAME

CROSS-REFERENCE TO RELATED APPLICATIONS

This application claims the benefit under 35 U.S.C. §119(a) of Korean Patent Application No. 10-2005-0084074, filed in the Korean Intellectual Property Office on Sep. 9, 2005, the entire disclosure of which is hereby incorporated by reference.

BACKGROUND OF THE INVENTION

1. Field of the Invention

The present invention relates to a backlight unit and a display device having the same. More particularly, the present invention relates to a backlight unit and a display device having the same which is capable of providing superior color reproducibility and low power consumption by using a point light source and a linear light source at substantially the same time.

2. Description of the Related Art

Recently, a flat panel display apparatus, such as a liquid crystal display (LCD), a plasma display panel (PDP), and an organic light emitting diode (OLED), has been developed to substitute for a conventional display such as a cathode ray tube (CRT).

An LCD comprises an LCD panel having a thin film transistor (TFT) substrate and a color filter substrate, and a liquid crystal disposed therebetween. Since the LCD panel does not emit light by itself, the LCD further comprises a backlight unit in back of the TFT substrate as a light source for providing light. The transmittance of the light emitted from the backlight unit is adjusted according to an arrangement of the liquid crystal. The LCD panel and the backlight unit are then typically accommodated in a chassis.

Depending on the location of the light source, the backlight unit may be classified as an edge type or a direct type backlight unit. The edge type backlight unit is provided with the light source at a lateral side of a light guiding plate and is typically used for relatively small sized LCDs, such as those used in laptops and desktop computers. The edge type backlight unit provides high light uniformity and good endurance, and is suitable for use in thin profile LCDs.

As the size of the LCD panel in the market has been increased, the development of the direct type backlight unit has been emphasized. The direct type backlight unit provides light on the entire surface of the LCD panel by disposing a plurality of light sources behind the LCD panel. The direct type backlight unit provides a high level of brightness by using a plurality of light sources, as compared with the edge type backlight unit, but the brightness is generally not sufficiently uniform.

A point light source such as a light emitting diode (LED) or a linear light source such as a lamp, has been recognized as a suitable light source for the edge type backlight unit. The lamp has low power consumption, but has poor color reproducibility. Alternatively, the LED has good color reproducibility, long life spans, and fast instant lighting, but has high power consumption and greater heat generation.

Accordingly, a need exists for a display device system and method that is capable of providing superior color reproducibility and having low power consumption.

SUMMARY OF THE INVENTION

Accordingly, it is an aspect of embodiments of the present invention to substantially solve the above and other problems, and to provide a backlight unit having superior color reproducibility and low power consumption.

Accordingly, it is another aspect of embodiments of the present invention to provide a display device comprising a backlight unit having superior color reproducibility and low power consumption.

Additional aspects and/or advantages of embodiments of the present invention will be set forth in part in the description which follows and, in part, will be obvious from the description, or may be learned by the practice of the present invention.

The foregoing and/or other aspects of embodiments of the present invention can be achieved by providing a backlight unit comprising a first light guide plate, a linear light source disposed along at least one side edge of the first light guide plate, a plurality of second light guide plates facing the first light guide plate, and a point light source disposed along at least one side edge of each second light guide plate.

According to an aspect of embodiments of the present invention, the first light guide plate comprises a light exiting surface, a first light incident surface provided on the opposite side of the light exiting surface and a second incident surface facing the linear light source, and a plurality of second light guide plates facing the first incident surface.

According to another aspect of embodiments of the present invention, the plurality of light exiting surfaces of the second light guide plates are parallel to the first incident surface of the first light guide plate.

According to another aspect of embodiments of the present invention, a distance between each light exiting surface of the second light guide plates and the first light incident surface of the first light guide plate is uniform.

According to another aspect of embodiments of the present invention, the backlight unit further comprises a reflecting plate disposed under the second light guide plate.

According to another aspect of embodiments of the present invention, the first light guide plate comprises a light exiting surface, a light reflecting surface provided on the opposite side of the light exiting surface and a light incident surface facing the linear light source, and a plurality of second light guide plates facing the light exiting surface of the first light guide plate.

According to another aspect of embodiments of the present invention, the plurality of light exiting surfaces of the second light guide plates are parallel to the light exiting surface of the first light guide plate.

According to another aspect of embodiments of the present invention, a distance between each light exiting surface of the second light guide plates and the light exiting surface of the first light guide plate is uniform.

According to another aspect of embodiments of the present invention, the backlight unit further comprises a reflecting plate disposed under the first light guide plate.

According to another aspect of embodiments of the present invention, the first light guide plate is a flat plate shape.

According to another aspect of embodiments of the present invention, the first light guide plate is a wedge shape.

According to another aspect of embodiments of the present invention, the linear light source is a cold cathode fluorescent lamp (CCFL) or an external electrode fluorescent lamp (EEFL).

According to another aspect of embodiments of the present invention, the point light source is a light emitting diode.

The foregoing and/or another aspects of embodiments of the present invention can be achieved by providing a display device comprising a display panel, a first light guide plate disposed in back of the display panel, a linear light source disposed along at least one side edge of the first light guide plate, a plurality of second light guide plates disposed in back of the first light guide plate, and a point light source disposed along at least one side edge of each second light guide plate.

According to an aspect of embodiments of the present invention, a light exiting surface of the second light guide plate is parallel to a light exiting surface of the first light guide plate.

According to another aspect of embodiments of the present invention, a distance between each light exiting surface of the second light guide plates and the light exiting surface of the first light guide plate is uniform.

According to another aspect of embodiments of the present invention, the first light guide plate is a flat plate shape and the second light guide plate comprises a wedge shape.

According to another aspect of embodiments of the present invention, the point light source is a light emitting diode.

According to another aspect of embodiments of the present invention, the display panel is a liquid crystal display panel.

It is to be understood that both the foregoing general description and the following detailed description are exemplary and explanatory, and are intended to provide further explanation of the invention as claimed.

BRIEF DESCRIPTION OF THE DRAWINGS

The above and/or other aspects and advantages of embodiments of the present invention will become apparent and more readily appreciated from the following description of the exemplary embodiments, taken in conjunction with the accompany drawings, in which.

Throughout the drawings, like reference numerals will be understood to refer to like parts, components and structures.

DETAILED DESCRIPTION OF EXEMPLARY EMBODIMENTS

Figure 1:
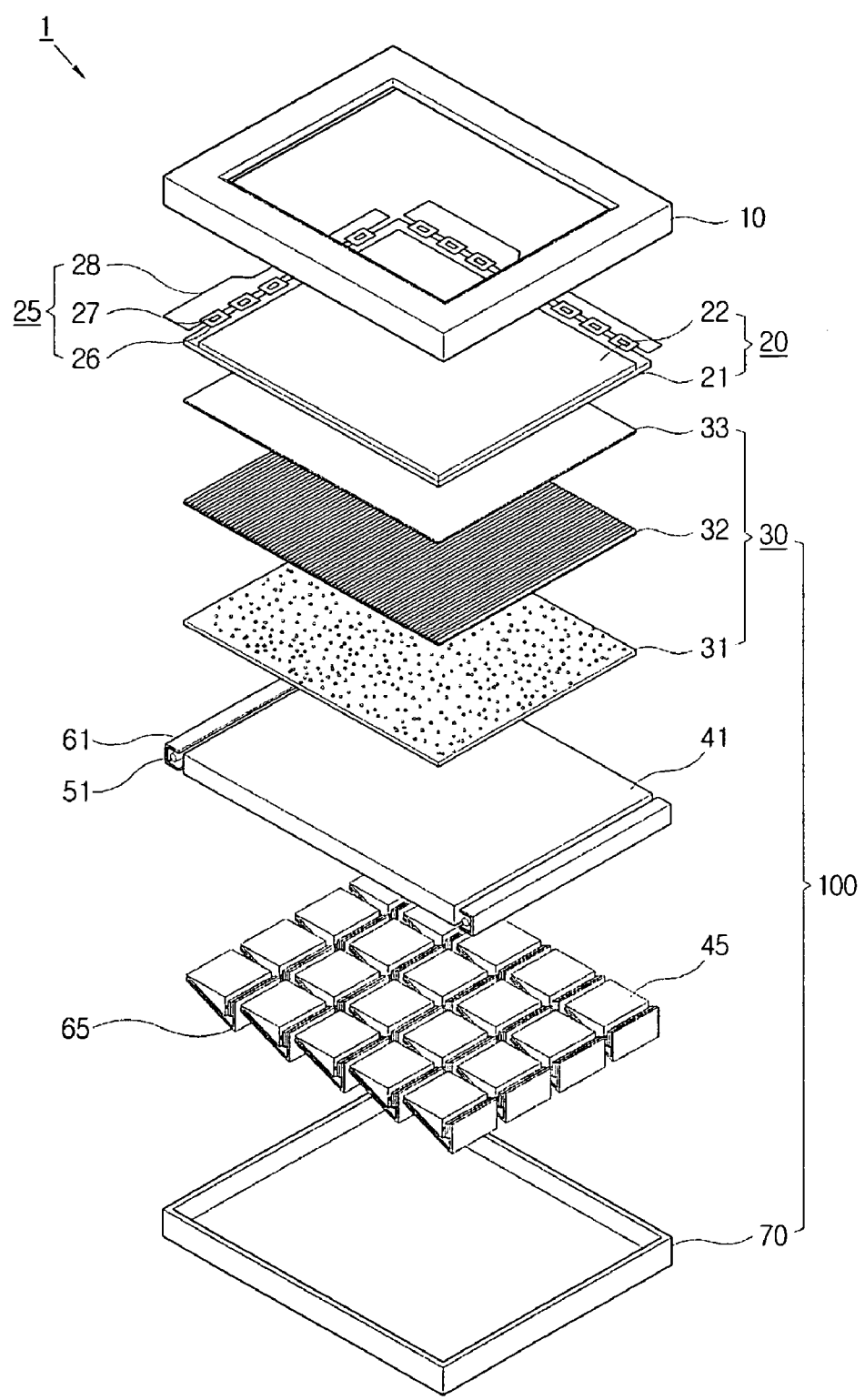
FIG. 1 is a perspective view of an exemplary LCD according to a first embodiment of the present invention.

Reference will now be made in detail to embodiments of the present invention, examples of which are illustrated in the accompanying drawings, wherein like reference numerals refer to like elements throughout. The embodiments are described below so as to explain the present invention by referring to the figures.

An exemplary liquid crystal display according to a first embodiment of the present invention will now be described with reference to the FIGS. 1 and 2.

Figure 2:
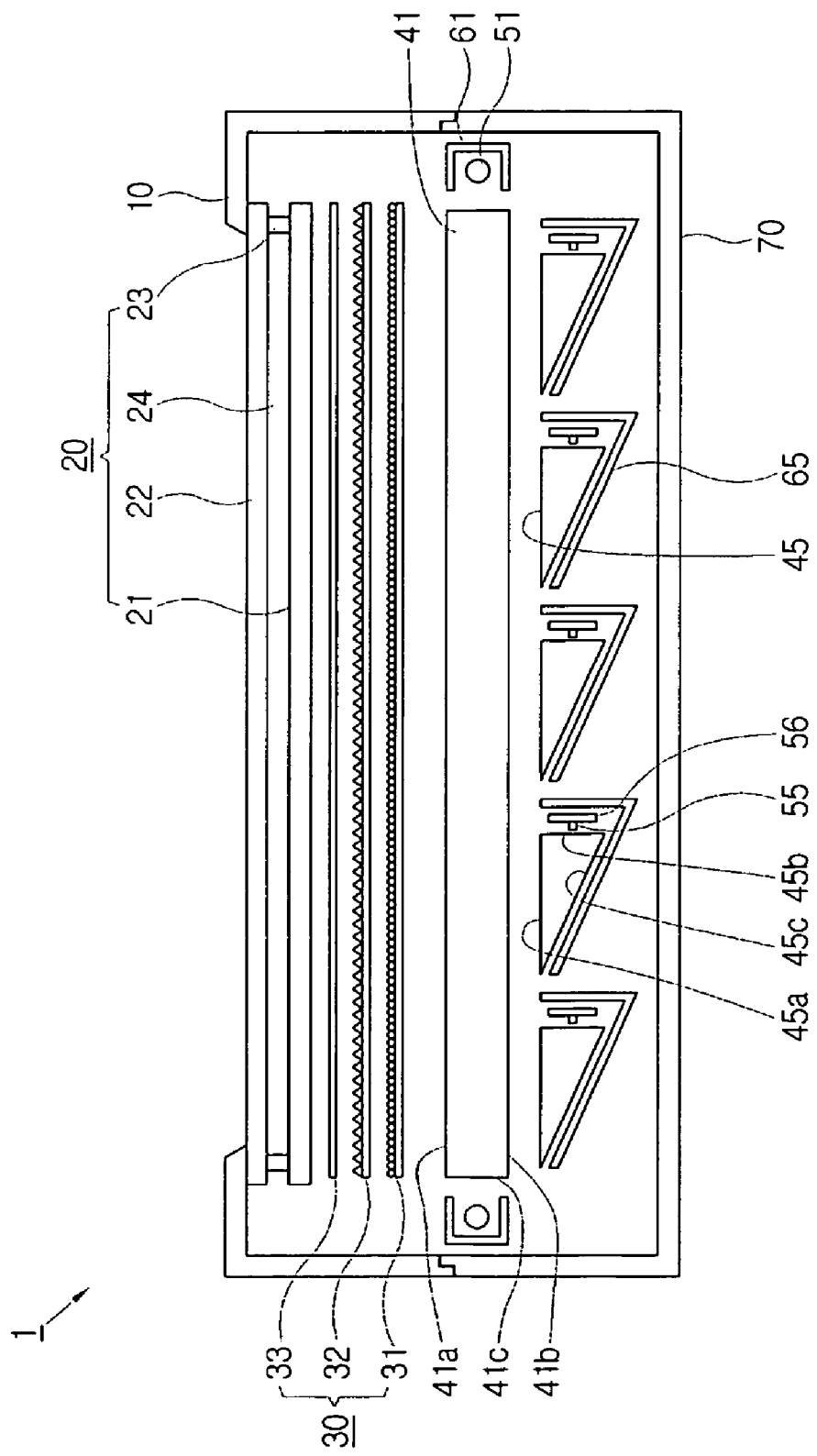
FIG. 2 is a sectional view of an exemplary LCD according to the first embodiment of the present invention.

FIG. 1 is an exploded perspective view of a liquid crystal display according to a first embodiment of the present invention, and FIG. 2 is a sectional view of the liquid crystal display according to the first embodiment of the present invention.

A liquid crystal display (LCD) 1 comprises an LCD panel 20 and a backlight unit 100 providing light for the LCD panel 20. The backlight unit 100 comprises a light regulating part 30, a first light guide plate 41, a second light guide plate 45, a lamp 51, a light emitting diode (LED) 55, and a reflecting plate 65.

The LCD panel 20, the light regulating part 30, the first light guide plate 41, the second light guide plate 45, the lamp 51, the LED 55, and the reflecting plate 65 are accommodated between an upper chassis 10 and a lower chassis 70.

The LCD panel 20 comprises a TFT substrate 21 on which TFTs are formed, a color filter substrate 22 facing the TFT substrate 21, a sealant 23 adhering the two substrates 21 and 22 and forming a cell gap, and a liquid crystal layer 24 surrounded by the two substrates 21 and 22, and the sealant 23. The LCD panel 20 according to the first embodiment is provided as a rectangular shape having a long side and a short side, but is not limited thereto. The LCD panel 20 controls the arrangement of the liquid crystal layer 24, thereby forming an image thereon. However, the LCD panel 20 is supplied with light from the backlight unit 100 disposed at its rear, as the LCD panel 20 does not emit light by itself.

A driving part 25 is disposed on a side of the TFT substrate 21 for applying driving signals to the LCD panel 20. The driving part 25 comprises a flexible printed circuit (FPC) 26, a driving chip 27 seated on the flexible printed circuit 26, and a printed circuit board (PCB) 28 connected on a side of the FPC 26. Here, the driving part 25 shown in FIG. 1 is a chip on film (COF) type, but is not limited thereto. Other types of driving parts may be used, such as, tape carrier package (TCP) or chip on glass (COG) type. Alternatively, the driving part 25 may be formed on the TFT substrate 21.

The light regulating part 30 disposed in back of the LCD panel 20 can comprise a diffusion sheet 31, a prism film 32, and a protection film 33.

The diffusion sheet 31 comprises a base plate and a coating layer having beads formed on the base plate, but is not limited thereto. The diffusion sheet 31 diffuses light through the first light guide plate 41, thereby improving the uniformity of brightness.

Triangular prisms are placed on the prism film 32 in a predetermined arrangement. The prism film 32 concentrates the light diffused from the diffusion sheet 31 in a direction perpendicular to a surface of the LCD panel 20. Typically, two prism films 32 are used, and the micro prisms formed on the prism film 32 form a predetermined angle with each other. The light passing through the prism film 32 progresses vertically, thereby forming a uniform brightness distribution. If necessary, a reflective polarizing film (not shown) can also be used along with the prism film 32, or only the reflective polarizing film can be used without the prism film 32.

The protection film 33, positioned at the top of the light regulating part 30, protects the prism film 32, which can be vulnerable to scratching.

The first light guide plate 41 is disposed beneath the diffusion sheet 31. The first light guide plate 41 has a flat plate shape and comprises a light exiting surface 41a opposite to the diffusion sheet 31, a first light incident surface 41b facing the light exiting surface 41a, and a pair of second light incident surfaces 41c facing the lamps 51. The incident light received through the first light incident surface 41*b* and the second light incident surfaces 41*c*, exits at the light exiting surface 41*a* toward the diffusion sheet 31. The light from a second light guide plate 45 disposed beneath the first light guide plate 41 enters the first light incident surface 41*b*, and the light from the lamps 51 enter the second light incident surfaces 41*c*. The first light guide plate 41 can be comprised of any number of suitable materials, such as polymethylmetacrylate (PMMA) of an acrylic resin type.

The lamps 51 are disposed along side edges of the first light guide plate 41. Each lamp 51 can be comprised of a cold cathode fluorescent lamp (CCFL), an external electrode fluorescent lamp (EEFL), or the like. A lamp cover 61 covering each lamp 51 reflects the light from the lamp 51 toward the second light incident surfaces 41*c* of the first light guide plate 41. The lamp cover 61 can be comprised of an aluminum plate or the like, and a material such as silver (Ag) having good reflectivity can be coated on a side thereof facing the lamp 51.

The plurality of second light guide plates 45 are disposed beneath the first light guide plate 41. The second light guide plates 45 having a wedge shape each comprises a light exiting surface 45*a* opposite to the first light incident surface 41*b*, a light incident surface 45*b* facing the LED 55, and a reflecting surface 45*c* facing the light exiting surface 45*a*. The light exiting through the light exiting surface 45*a* enters the first light incident surface 41*b* of the first light guide plate 41, and is then mixed with the light from the lamp 51 of the first light guide plate 41. The mixed light is then transferred to the diffusion sheet 31 through the light exiting surface 41*a* of the first light guide plate 41.

The second light guide plates 45 have a regular size and the plurality of light exiting surfaces 45*a* are disposed in parallel with each other. Each light exiting surface 45*a* is disposed at a uniform distance with respect to the first light guide plate 41. The second light guide plate 45 can also be comprised of polymethylmetacrylate (PMMA) of an acrylic resin type.

Each LED 55 facing the light incident surface 45*b* of the second light guide plate 45 emits red, green and blue light and provides white light through color mixing. The LED 55 and the light incident surface 45*b* are spaced apart at a predetermined distance so as to perform the color mixing. The LED 55 is seated on an LED circuit board 56. The core of the LED circuit board 56 can be comprised of aluminum (Al) or any suitable material having good heat transfer rates.

The reflecting plates 65 are provided beneath the reflecting surface 45*c* of the second light guide plates 45. The reflecting plate 65 reflects the incident light entering the reflecting surface 45*c* of the light from the LED 55 to be directed toward the light exiting surface 45*a*. The reflecting plates 65 can be made of any suitable materials such as polyethylene terephthalate (PET) or polycarbonate (PC), and/or can be coated with silver (Ag) or aluminum (Al).

The reflecting plate 65 is elongated along the back of the LED circuit board 56 and can further cover a portion of the light exiting surface 45*a* in yet other exemplary embodiments of the present invention. In addition to the reflecting plate 65, an LED cover enclosing the LED circuit board 56 can be provided.

According to the above described first embodiment, the backlight unit 100 uses the lamp 51 having superior power consumption, and the LED 55 having superior color reproducibility, substantially at the same time. Accordingly, the power consumption can be decreased compared with a case wherein only the LED 55 is used in the backlight unit 100, and the color reproducibility can be increased compared with a case wherein only the lamp 51 is used in the backlight unit 100.

To acquire the equivalent brightness, the LED 55 has a power consumption of 150% as compared with the lamp 51. In the first embodiment, the power consumption to acquire the equivalent brightness can decrease to a level between that of the lamp 51 and that of the LED 55. If the lamp 51 is used, the color reproducibility is about 72% of the national television system committee (NTSC) standard, but the performance of the first embodiment of the present invention can be increased up to 10% compared with the NTSC standard. If the LED 55 is used, there can be a matter of heat generation. However, the matter of heat generation is decreased since the LEDs 55 are separated according to the first embodiment.

Alternatively, since the second light guide plate 45 in which the LED 55 provides the light is provided as a plurality, driving of the LED 55 can be modified and varied. For example, the brightness of the LED 55 can be adjusted according to a contrast of each portion of a screen. In addition, a color of the LED 55 can be adjusted according to a color of each portion of the screen. In another example, the LED 55 can be driven sequentially and repeatedly according to a scan of the screen. In such a driving method, the LED 55 is effectively driven by portions, since interference between adjacent second light guide plates 45 is minimal.

Figure 3:
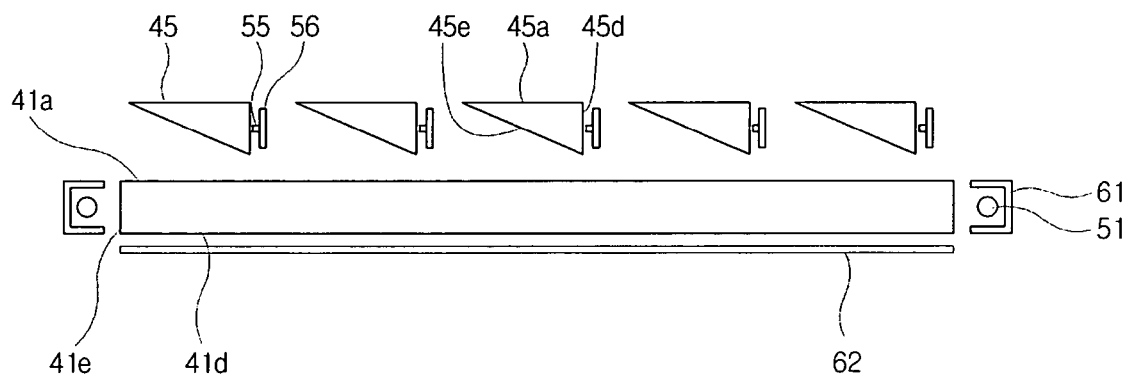
FIG. 3 is a sectional view of an exemplary LCD according to a second embodiment of the present invention.
Figure 4:
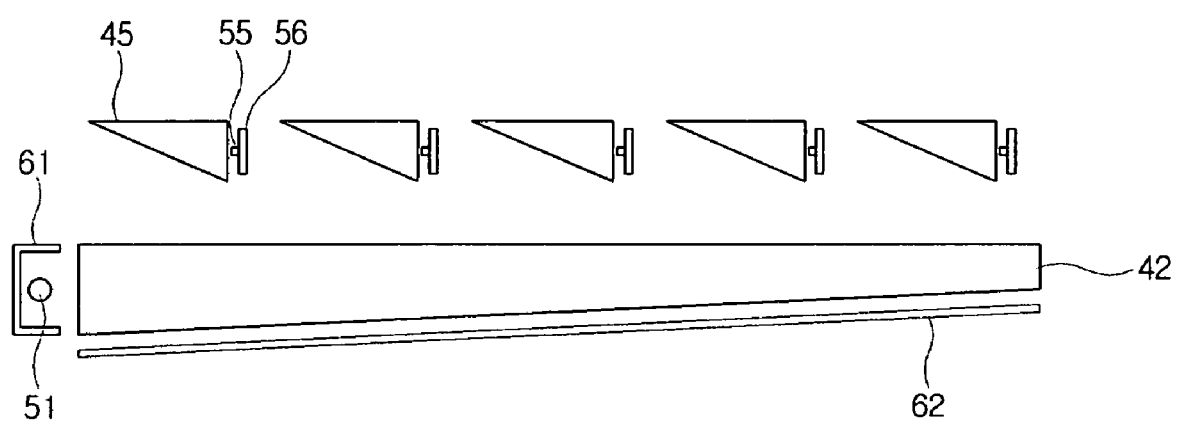
FIG. 4 is a sectional view of an exemplary LCD according to a third embodiment of the present invention.
Figure 5:
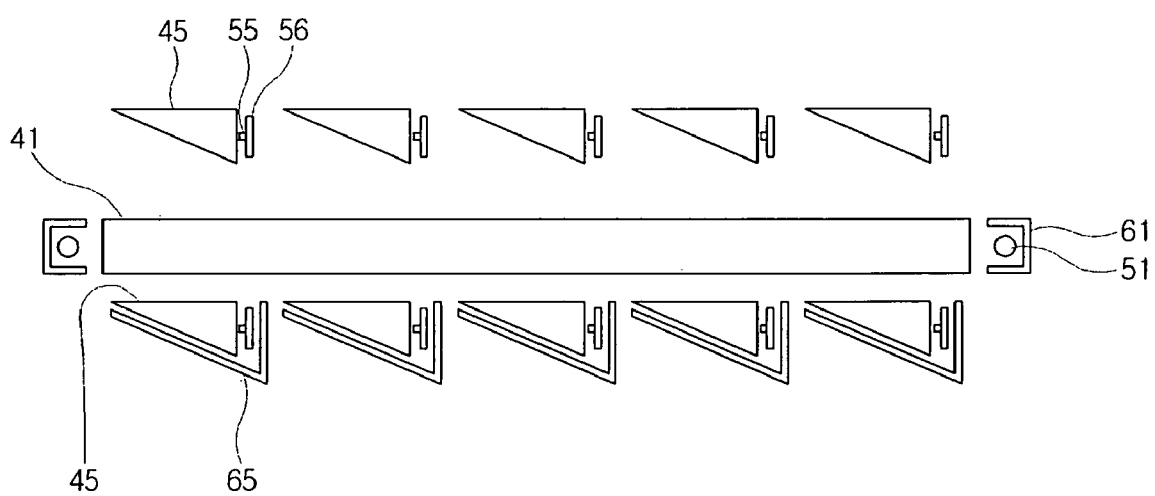
FIG. 5 is a sectional view of an exemplary LCD according to a fourth embodiment of the present invention.

The backlight unit 100 according to embodiments of the present invention can have various modifications and variations as shown in FIGS. 3 through 5.

According to a second embodiment shown in FIG. 3, the second light guide plate 45 is disposed above the first light guide plate 41.

The first light guide plate 41 having a flat plate shape, comprises the light exiting surface 41*a* facing the second light guide plate 45, a reflecting surface 41*d* provided on the opposite side of the light exiting surface 41*a*, and a pair of light incident surfaces 41*e* facing the lamps 51.

The second light guide plate 45 having a wedge shape comprises the light exiting surface 45*a* exiting light therefrom, a first incident surface 45*d* facing the LED 55, and a second incident surface 45*e* facing the first light guide plate 41.

The light generated from the lamp 51 exits the light exiting surface 41*a* of the first light guide plate 41 and enters the second incident surface 45*e* of the second light guide plate 45 and is then mixed with light generated from the LED 55. The mixed light exits the light exiting surface 45*e* of the second light guide plate 45.

A reflecting plate 62 is provided beneath the light reflecting surface 41*d* of the first light guide plate 41.

According to a third embodiment of the present invention as shown in FIG. 4, a first light guide plate 42 has a wedge shape and the lamp 51 is disposed on one side of the first light guide plate 42. The second light guide plate 45 is disposed above the first light guide plate 42.

According to a fourth embodiment of the present invention as shown in FIG. 5, the second light guide plate 45 is disposed on both sides of the first light guide plate 41. The reflecting plate 65 is disposed beneath the lower second light guide plate 45 which is disposed beneath the first light guide plate 41.

Figure 6:
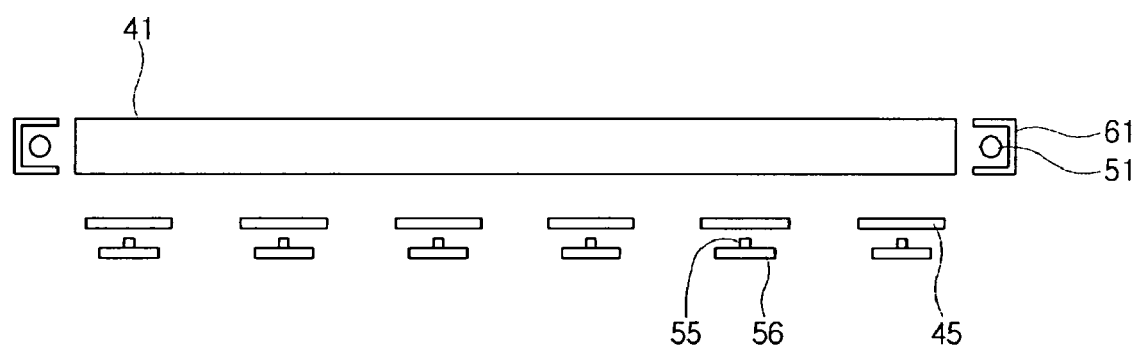
FIG. 6 is a sectional view of an exemplary LCD according to a fifth embodiment of the present invention.

According to a fifth embodiment of the present invention as shown in FIG. 6, the second light guide plate 45 is flat plate shape and disposed below the first light guide plate 41. The light emitting diode 55 is disposed below the second light guide plate 45.

It will be apparent to those skilled in the art that various modifications and variations can be made in the present invention without departing from the spirit or scope of the invention. Thus it is intended that the present invention cover the modifications and variations of this invention within the scope of the appended claims and their equivalents.

What is claimed is:

1. A backlight unit, comprising:
    a first light guide plate;
    at least one linear light source disposed adjacent to the first light guide plate;
    a plurality of second light guide plates facing the first light guide plate;
    a point light source disposed adjacent to each second light guide plate; and
    a point light source circuit board on which the point light source is seated,
    wherein a light exiting surface of the first light guide plate is substantially perpendicular to the point source circuit board.

2. The backlight unit according to claim 1, wherein the first light guide plate comprises:
    a light exiting surface;
    a first light incident surface provided on an opposite side of the light exiting surface; and
    a second incident surface facing the linear light source,
    wherein the plurality of second light guide plates face the first incident surface.

3. The backlight unit according to claim 2, wherein the plurality of light exiting surfaces of the second light guide plates are substantially parallel with the first incident surface of the first light guide plate.

4. The backlight unit according to claim 3, wherein distance between each light exiting surface of the second light guide plates and the first light incident surface of the first light guide plate is uniform.

5. The backlight unit according to claim 4, wherein the light exiting surface of the second light guide plates and light incident surface of the second light guide plates are substantially flat.

6. The backlight unit according to claim 2, further comprising a reflecting plate disposed under the second light guide plate.

7. The backlight unit according to claim 1, wherein the first light guide plate comprises:
    a light reflecting surface provided on an opposite side of the light exiting surface; and
    a light incident surface facing the linear light source,
    wherein the plurality of second light guide plates face the light exiting surface of the first light guide plate.

8. The backlight unit according to claim 7, wherein the plurality of light exiting surfaces of the second light guide plates are substantially parallel with the light exiting surface of the first light guide plate.

9. The backlight according to claim 8, wherein distance between each light exiting surface of the second light guide plates and the light exiting surface of the first light guide plate is uniform.

10. The backlight unit according to claim 7, further comprising a reflecting plate disposed under the first light guide plate.

11. The backlight unit according to claim 1, wherein the first light guide plate comprises a flat plate shape.

12. The backlight unit according to claim 1, wherein the first light guide plate comprises a wedge shape.

13. The backlight unit according to claim 1, wherein the linear light source comprises at least one of a cold cathode fluorescent lamp (CCFL) and an external electrode fluorescent lamp (EEFL).

14. The backlight unit according to claim 1, wherein the point light source comprises a light emitting diode.

15. A display device, comprising:
    a display panel;
    a first light guide plate disposed in back of the display panel;
    a linear light source disposed adjacent to the first light guide plate;
    a plurality of second light guide plates disposed in back of the first light guide plate;
    a point light source disposed adjacent to each second light guide plate; and
    a point light source circuit board on which the point light source is seated,
    wherein a light exiting surface of the first light guide plate is substantially perpendicular to the point source circuit board.

16. The display device according to claim 15, wherein a light exiting surface of the second light guide plate is substantially parallel with a light exiting surface of the first light guide plate.

17. The display device according to claim 16, wherein uniform distance between each light exiting surface of the second light guide plates and the light exiting surface of the first light guide plate is uniform.

18. the display device according to claim 15, wherein:
    the first light guide plate comprises a flat plate shape: and
    the second light guide plate comprises a wedge shape.

19. The display device according to claim 15, wherein the point light source comprises a light emitting diode.

20. The display device according to claim 15, wherein the display panel comprises a liquid crystal display panel.

* * * * *